United States Patent [19]
Rottler et al.

[11] Patent Number: 6,097,730
[45] Date of Patent: Aug. 1, 2000

[54] TRANSCODER UNIT

[75] Inventors: Ralf Rottler, Neuhausen; Günther Hoen, Ditzingen, both of Germany

[73] Assignee: Alcatel, Paris, France

[21] Appl. No.: 08/939,374

[22] Filed: Sep. 29, 1997

[30] Foreign Application Priority Data

Sep. 30, 1996 [DE] Germany ............................ 196 40 040

[51] Int. Cl.[7] ...................................................... A04J 3/22
[52] U.S. Cl. ........................................... 370/465; 370/336
[58] Field of Search .................................... 370/465, 468, 370/466, 477, 614, 336

[56] References Cited

U.S. PATENT DOCUMENTS

| | | | |
|---|---|---|---|
| 5,313,699 | 5/1994 | Freige et al. ............................... | 29/832 |
| 5,475,686 | 12/1995 | Bach et al. .................................. | 370/84 |
| 5,513,181 | 4/1996 | Bresalier et al. .......................... | 370/79 |

FOREIGN PATENT DOCUMENTS

| | | |
|---|---|---|
| 0 590 412 A1 | 4/1994 | European Pat. Off. . |
| 0600197 | 6/1994 | European Pat. Off. . |
| 4129332 | 3/1993 | Germany . |
| 44 09 128 C1 | 1/1995 | Germany . |
| 29604130 | 5/1996 | Germany . |

OTHER PUBLICATIONS

WPI English abstract of Friedrich DE 44 09 128 C1, laid open Jan. 26, 1995.
WPI English abstract of Fleckenstein+/Siemens EP 0 590 412 A1, published Apr. 6, 1994.
Farber, Georg, "Bussysteme—Parallele und serielle Bussysteme in Theorie und Praxis" R. Oldenbourg Verlag, Muchen, Wien 1984, pp. 32–61.
"Der VME–Bus—ein Überblick" by Von WErner Hilf. In: Technische Rundschau 44/86, pp. 84, 85, 88, 89, 91.
European Telecommunication Standard, ETS 300–597, European Telecommunications Standard Institute, 1994.
European Telecommunication Standard, ETS 300–580–2, European Telecommunications Standards Institute 1994.
European Telecommunication Standard, ETS 300–580–5, European Telecommunications Standards Institute 1994.

*Primary Examiner*—Douglas W. Olms
*Assistant Examiner*—Ken Vanderpuye
*Attorney, Agent, or Firm*—Ware, Fressola, Van Der Sluys & Adolphson LLP

[57] ABSTRACT

In order to improve a transcoder unit (TRCU) for use in a telecommunications network in such a way that digital voice signals can be transmitted at different transcoding rates, it is proposed to dispose at least two arithmetic units (FR, HR, EFR) with different transcoding rates on respective plug-in circuit boards in the transcoder unit, and to provide the transcoder unit with a subrack with backpanel wiring which receives these plug-in circuit boards. In this manner, arithmetic units each containing eight digital signal processors, for example, are provided for each of the different transcoding rates. The arithmetic unit can be optimized for each transcoding rate. Individual plug-in circuit boards can be replaced or added as supplements. The transcoder unit (TRCU) is modular in construction and can be assembled or converted very flexibly, e.g., in the manner of a backplane system. The transcoder unit is used, for example, in a wireless telecommunications network, i.e., in a mobile radio network.

7 Claims, 2 Drawing Sheets

TRANSCODER UNIT

TECHNICAL FIELD

This invention relates to a transcoder unit comprising at least two arithmetic units which transcode digital voice signals for transmission in a telecommunications network.

BACKGROUND OF THE INVENTION

Such a transcoder unit is known from EP 600 197 A2. There, a transcoder unit for a wireless telecommunications network, namely for a mobile radio network, is described. It contains several arithmetic units in the form of digital signal processors for performing transcoding operations on voice signals which are digitally transmitted on several communication channels. Use is made of transcoding methods which are specified in the GSM (Global System for Mobile Communications) standard. According to the description in column 2, lines 4 to 52, of that reference, five processors support the transcoding of eight communication channels. As also described there, the transcoder unit includes an input/output processor which controls access to the individual signal processors. These measures reduce the number of signal processors required. All processors used, i.e., all arithmetic units, are disposed on a circuit board. Transmission of digital voice signals at different transcoding rates is not described there.

In a mobile radio network based on the GSM standard, transmission modes with different transcoding rates are provided. Recommendations GSM08.60, GSM06.10-12, and GSM06.31-32 define the so-called full rate mode, in which voice signals are transcoded between transmissions at 16 kb/s and 64 kb/s. GSM08.61, GSM06.20-22, and GSM06.41-42 define the so-called half rate mode, in which voice signals are transcoded between transmission at 8 kb/s and 64 kb/s. GSM08.60, GSM60-62, and GSM6.81-82 define the so-called enhanced full rate mode, which corresponds to an improvement on the full rate mode in terms of signal quality. The construction of a transcoder unit is not dealt with in the GSM standard.

SUMMARY OF THE INVENTION

The object of the invention is to improve a transcoder unit of the above kind for use in a communications network in such a way that transmission of digital voice signals is possible at different transcoding rates.

This object is attained by a transcoder unit comprising at least two arithmetic units which transcode digital voice signals for transmission in a telecommunications network, wherein the arithmetic units transcode the voice signals at different transcoding rates and are each disposed on a respective plug-in circuit board, and that the transcoder unit further comprises a subrack with backpanel wiring which receives the plug-in circuit boards.

Also proposed, are a mobile switching center, a base station controller, and a telecommunications network which are equipped with this transcoder unit.

The transcoder unit according to the invention contains at least two arithmetic units which transcode voice signals at different transcoding rates and which are each disposed on a respective plug-in circuit board, as well as a subrack with backpanel wiring which receives the plug-in circuit boards. A respective arithmetic unit is thus provided for each of the different transcoding rates. For the arithmetic units, processors, particularly digital signal processors, or logic circuits, particularly so-called ASICs, can be used. Thus, the optimum arithmetic unit can be used for each transcoding rate. Since the proposed construction of the transcoder unit includes a subrack with backpanel wiring, individual plug-in circuit boards can be replaced or added as supplements. The transcoder unit is therefore modular in construction and can be assembled or converted very flexibly in the manner of a backplane system. Plug-in circuit boards with processors for low, medium or high transcoding rates, for example, can be quickly replaced or added.

BRIEF DESCRIPTION OF THE DRAWINGS

The invention will become more apparent from the following description of an embodiment taken in conjunction with the accompanying drawings, in which.

BEST MODE FOR CARRYING OUT THE INVENTION

Figure 1:
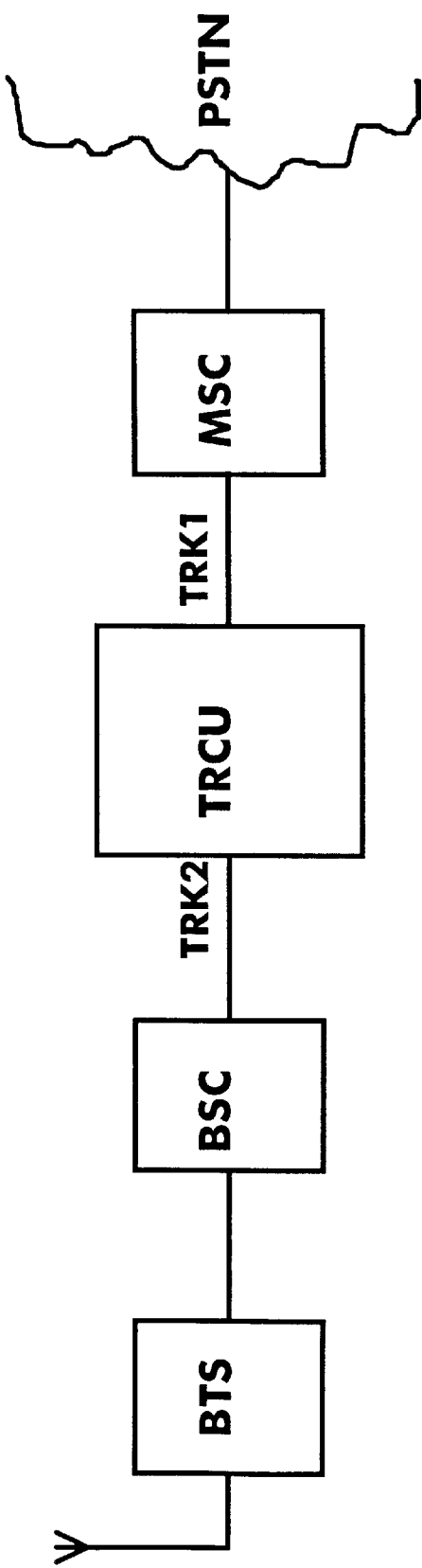
FIG. 1 shows schematically a mobile radio network with a trancoder unit.

FIG. 1 shows schematically the structure of a mobile radio network, i.e., the structure of a wireless telecommunications network. The mobile radio network contains the following components (only one of each of the components is shown by way of example): a radio base station BTS, a base station controller BSC connected thereto, a transcoder unit TRCU connected to the base station controller, and a mobile switching center MSC connected to the transcoder unit and to a public telecommunications network PSTN. In this example, the transcoder unit TRCU is connected between the base station controller BSC and the mobile switching center MSC in order to convert the digital voice signals on the link between these two components from an encoding scheme used in first communication channels to an encoding scheme used in second, more narrow-band communication channels. To this end, the transcoder unit is connected to the mobile switching center MSC by a first transmission line TRK1, over which the first communication channels are transmitted in multiplexed form. This first transmission line is a so-called PCM-30 line with 30 64-kb/s voice channels. The transcoder unit is further connected to a second transmission line TRK2, over which the second communication channels, here 30 16-kb/s voice channels, are transmitted in multiplexed form.

Figure 2:
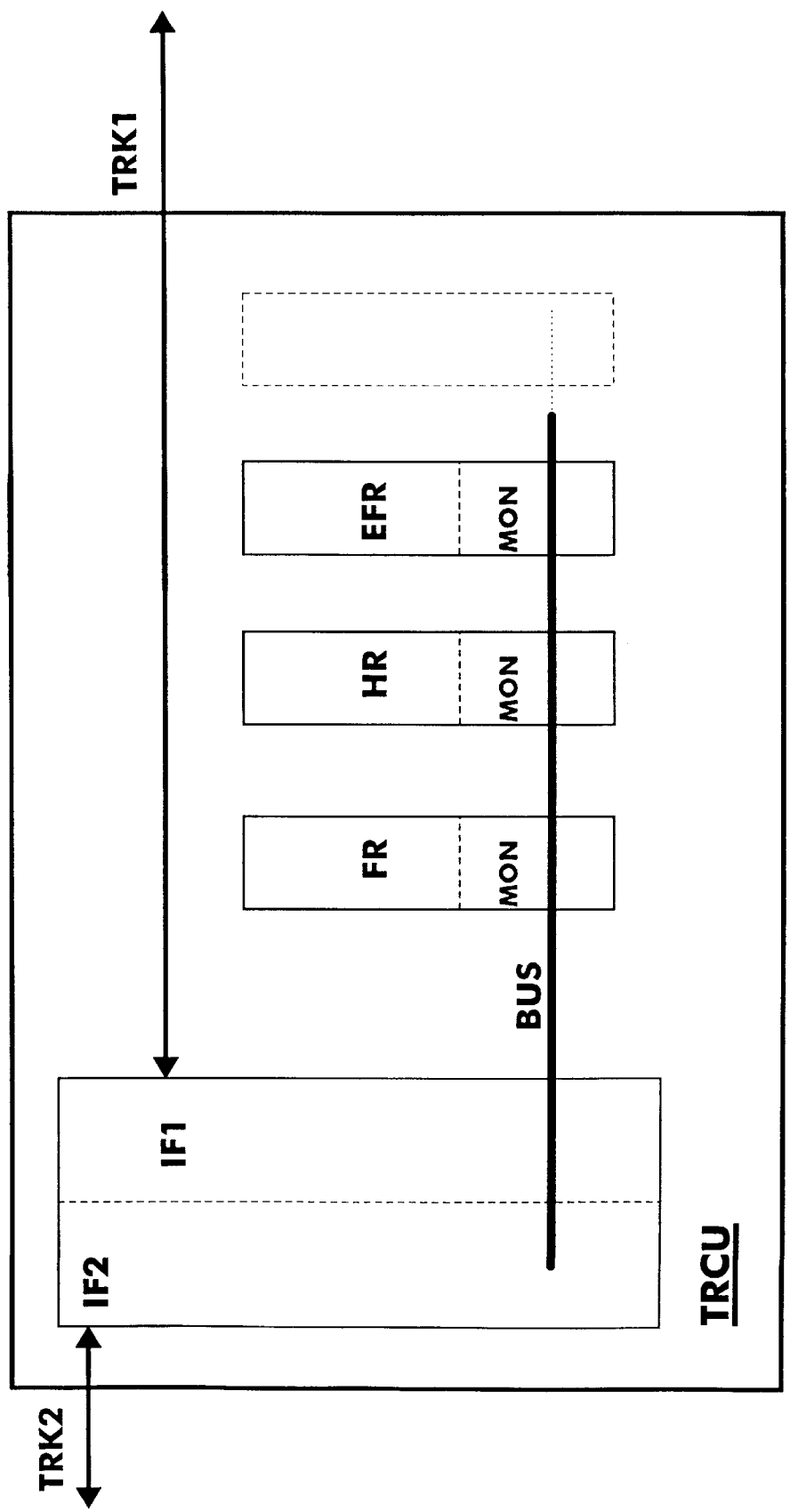
FIG. 2 shows schematically the construction of the transcoder unit.

FIG. 2 shows the construction of the transcoder unit TRCU in a schematic diagram. In this example, the transcoder unit contains three arithmetic units FR, HR, and EFR which are each disposed on a respective plug-in circuit board and which transcode the voice signals at different transcoding rates. In this example, each arithmetic unit contains 16 digital processors. The processors of the arithmetic unit HR transcode at a low transcoding rate in the above-mentioned half rate mode; the processors of the arithmetic unit FR transcode at a medium transcoding rate in the above-mentioned full rate mode; and the processors of the arithmetic unit EFR transcode at a high trancoding rate in the above-mentioned enhanced full rate mode. The trancoder unit TRCU has a back-panel wiring, which includes a data bus BUS, and interface circuits IF1 and IF2, connected to the data bus, for interfacing the trancoder unit to the base station controller BSC and the mobile switching center MSC of FIG. 1.

The interface circuit IF1 is connected to the mobile switching center MSC by the first transmission line TRK1, over which, in this example, 30 64-kb/s voice channels are transmitted in a multiplex mode according to the PCM-30 standard. The interface circuit IF2 is connected to the base station controller BSC by the second transmission line TRK2, over which more narrow-band communication channels, in this example 30 16-kb/s voice channels, are transmitted in a multiplex mode.

Each plug-in circuit board contains a circuit (not shown) with a monitoring circuit (MON) which monitors the second, more narrow-band communication channels in order to detect indicators of a transmission quality desired by a subscriber of the mobile radio network and to control the selection of one of the arithmetic units FR, HR, EFR for transcoding the voice signals.

The operation of the transcoder unit TRCU will now be described in more detail.

A duplex communication link is to be established between, for example, a mobile subscriber and a subscriber of the public switched telecommunications network PSTN. The mobile subscriber uses a mobile telephone which transmits and receives in the full rate mode at a transmission rate of 16 kb/s, of which 13 kb/s are used for the voice signal as such and 3 kb/s for the necessary signaling. The subscriber of the public telecommunications network uses an ISDN telephone, which transmits and receives voice signals at a transmission rate of 64 kb/s. The circuits (not shown) on the plug-in circuit boards which control access to the data bus BUS include the monitoring circuits MON, which monitor the voice signals on the second transmission line TRK2. From the bit pattern of the digital voice signal coming from the mobile subscriber, the monitoring circuit MON connected to the processors FR determines that the mobile telephone operates in the full rate mode. Then, the circuit containing this monitoring circuit MON controls the access by the processors FR to the data bus BUS. One of these processors subsequently converts the voice signal to a 64-kb/s PCM signal. The voice signal is then routed over the data bus BUS, through the interface circuit IF1, and over the first transmission line TRK1 to the mobile switching center MSC. From there it is transmitted over the public telecommunications network PSTN to the other subscriber. In the opposite direction, the voice signal from the other subscriber is transmitted to the transcoder unit TRCU, where it is converted by one of the processors FR from 64 kb/s to 16 kb/s and then transmitted over the second transmission line TRK2 to the mobile subscriber.

The processors FR, HR, EFR are designed to be capable of transcoding the voice signals on several channels at the same time. The 16 processors on each plug-in circuit board process 64 channels in the full rate mode, 32 channels in the half rate mode, and 32 channels in the enhanced full rate mode. In the above example, the voice signals which are exchanged over a duplex communication link between a mobile subscriber and a fixed-network subscriber are transcoded. The transcoder unit TRCU also transcodes voice signals which are transmitted between two mobile subscribers. For example, a voice signal coming from a first mobile subscriber in a half rate format (8 kb/s) is converted to a 64-kb/s PCM signal by one of the processors HR and then to a full rate format (16 kb/s) by one of the processors FR, and subsequently transmitted to a second mobile subscriber, who receives this voice signal in the full rate mode.

The above-described design of the transcoder unit with the data bus BUS and the monitoring circuits MON permits random access to the arithmetic units, i.e., to each of the processors FR, HR, and EFR, for the transcoding of voice signals. Accordingly, the transcoder unit TRCU is constructed in the manner of a processor pool. The construction of the transcoder unit TRCU using the backpanel wiring and the plug-in circuit boards allows a quick and simple replacement of the arithmetic units. It is also possible to provide slots for new plug-in circuit boards, so that further arithmetic units, such as digital signal processors or ASICs, can be readily added. The transcoder unit can thus be very quickly and easily adapted to the requirements of the mobile radio network. In this example, the transcoder unit contains arithmetic units for the half rate mode, for the full rate mode, and for the enhanced full rate mode. Other configurations are also possible, of course.

In this example, the transcoder unit is connected between the base station controller BSC and the mobile switching center MSC. It is also possible to incorporate the transcoder unit into the mobile radio network at another point, such as between the base station controller and the base station. The transcoder unit may also be integrated with the mobile switching center or the base station controller.

The above-described example relates to the use of the transcoder unit in a mobile radio network based on the GSM standard. It is also possible to use the transcoder unit in other wireless telecommunications networks or in wireline networks.

What is claimed is:

1. A transcoder unit (TRCU) comprising at least two processors (FR, HR, EFR) which transcode digital voice signals for transmission in a telecommunications network, wherein the processors (FR, HR, EFR) simultaneously transcode the voice signals at different respective transcoding rates and are disposed on respective plug-in circuit boards, each processor on one of said respective plug-in circuit boards transcodes at a transcoding rate common to all processors on its board, the transcoder unit (TRCU) further comprises a subrack with backpanel wiring (BUS) which receives the plug-in circuit boards, the backpanel wiring comprises a data bus (BUS), and each plug-in circuit board contains a circuit which is connected to the data bus and controls random access to the processors (FR, HR, EFR) via the data bus; and further comprising interface circuits (IF1, IF2) which are connected to the data bus (BUS) and connect the transcoder unit (TRCU) with first transmission lines (TRK1) of the telecommunications network, over which first communication channels are transmitted in multiplexed form, and with second transmission lines (TRK2) of the telecommunications network, over which second, more narrow-band, communication channels are transmitted in multiplexed form.

2. A transcoder unit (TRCU) as claimed in claim 1, wherein the circuits on said plug-in boards controlling access comprise monitoring circuits (MON) which monitor the second, more narrow-band communication channels to detect an indicator of a transmission quality desired by a subscriber of the telecommunications network and to control access to one of the processors (HR) in accordance with the indicator.

3. A transcoder unit (TRCU) as claimed in claim 2, wherein, in order to detect the indicator, the monitoring circuits (MON) analyze the bit patterns of the voice signals.

4. A mobile switching center (MSC) with a transcoder unit (TRCU) comprising at least two processors (FR, HR, EFR) which transcode digital voice signals for transmission in a mobile radio network, and a pair of interface circuits (IF1, IF2) which connect the transcoder unit, respectively, to first wide-band multiplex communication channels (TRK1) and to second more narrow-band multiplex communication channels (TRK2), wherein said processors (FR, HR, EFR) simultaneously transcode voice signals at different respective transcoding rates and are each disposed on a respective plug-in circuit board, and the transcoder unit (TRCU) further comprises a subrack with backpanel wiring, including a data bus (BUS), which receives the plug-in circuit boards and each plug-in circuit board contains a circuit which is connected to the data bus and controls random access to the processors (FR, HR, EFR) via the data bus.

5. A base station controller (BSC) with a transcoder unit (TRCU) comprising at least two processors (FR, HR, EFR) which transcode digital voice signals for transmission in a mobile radio network, and a pair of interface circuits (IF1, IF2) which connect the transcoder unit, respectively, to first wide-band multiplex communication channels (TRK1) and to second more narrow-band multiplex communication channels (TRK2), the processors (FR, HR, EFR) simultaneously transcode voice signals at different respective transcoding rates and are each disposed on a respective plug-in circuit board, and the transcoder unit (TRCU) further comprises a subrack with backpanel wiring, including a data bus (BUS), which receives the plug-in circuit boards, and each plug-in circuit board contains a monitoring circuit which is connected to the data bus and controls random access to the processors (FR, HR, EFR) via the data bus.

6. A telecommunications network with a transcoder unit (TRCU) comprising at least two processors (FR, HR, EFR) which transcode digital voice signals for transmission in the telecommunications network, and a pair of interface circuits (IF1, IF2) which connect the transcoder unit, respectively, to first wide-band multiplex communication channels (TRK1) and to second more narrow-band multiplex communication channels (TRK2), wherein the processors (FR, HR, EFR) simultaneously transcode voice signals at different respective transcoding rates and are each disposed on a respective plug-in circuit board, and the transcoder unit (TRCU) further comprises a subrack with backpanel wiring, including a data bus (BUS), which receives the plug-in circuit boards, and each plug-in circuit board contains a monitoring circuit which is connected to the data bus and controls random access to the processors (FR, HR, EFR) via the data bus.

7. A transcoder unit (TRCU) comprising at least two processors (FR, HR, EFR) which transcode digital voice signals for transmission in a telecommunications network, and a pair of interface circuits (IF1, IF2) which connect the transcoder unit, respectively, to first wide-band multiplex communication channels (TRK1) and to second more narrow-band multiplex communication channels (TRK2), wherein the processors (FR, HR, EFR) operate to simultaneously transcode voice signals at different respective transcoding rates and are disposed on a plurality of respective plug-in circuit boards, and the transcoder unit (TRCU) further comprises a subrack with backpanel wiring, including a data bus (BUS), which receives the plug-in circuit boards, and each plug-in circuit board contains a monitoring circuit which is connected to the data bus and detects a bit pattern of digital voice signals coming from a subscriber and, in accordance therewith, controls random access to the processors (FR, HR, EFR) via the data bus.

* * * * *

UNITED STATES PATENT AND TRADEMARK OFFICE
CERTIFICATE OF CORRECTION

PATENT NO. : 6,097,730
DATED : August 1, 2000
INVENTOR(S) : Rottler et al.

It is certified that error appears in the above-identified patent and that said Letters Patent is hereby corrected as shown below:

Title page, item [56] References Cited
"U.S. PATENT DOCUMENTS" should include 8 U.S. Patent Documents listed on Examiner's Notice of References Cited, namely:

| | | |
|---|---|---|
| 4,675,863 | 6/87 | Paneth et al. |
| 5,172,393 | 12/92 | Hessler et al. |
| 5,436,900 | 7/95 | Hammar et al. |
| 5,438,569 | 8/95 | Kapadia et al. |
| 5,455,829 | 10/95 | Klingberg |
| 5,608,759 | 3/97 | Fujiwara |
| 5,608,779 | 3/97 | Lev et a. |
| 5,666,384 | 9/97 | Kuban et al. |

At column 4, claim 1, line 44, "and" should be deleted.

At column 5, claim 5, line 21, "wide-band" should be --wider-band--.

At column 5, claim 5, line 22, "narrow-band" should be --narrower-band--.

UNITED STATES PATENT AND TRADEMARK OFFICE
CERTIFICATE OF CORRECTION

PATENT NO. : 6,097,730
DATED : August 1, 2000
INVENTOR(S) : Rottler et al.

It is certified that error appears in the above-identified patent and that said Letters Patent is hereby corrected as shown below:

At column 6, claim 6, line 1 "wide-band" should be --wider-band--.

At column 6, claim 6, line 2 "narrow-band" should be --narrower-band--.

At column 6, claim 7, line 20 "wide-band" should be --wider-band--".

At column 6, claim 7, line 22, "narrow-band" should be --narrower-band--.

Signed and Sealed this

Tenth Day of April, 2001

NICHOLAS P. GODICI

Attest:

Attesting Officer

Acting Director of the United States Patent and Trademark Office